United States Patent [19]

Suzuki et al.

[11] Patent Number: 4,805,144
[45] Date of Patent: Feb. 14, 1989

[54] SOLID MEMORY MEDIUM AND INFORMATION REPRODUCTION SYSTEM USING THE MEDIUM

[75] Inventors: Makoto Suzuki, Nagoya; Akihiro Suzuki, Nishio, both of Japan

[73] Assignee: Brother Kogyo Kabushiki Kaisha, Aichi, Japan

[21] Appl. No.: 34,050

[22] Filed: Apr. 6, 1987

[30] Foreign Application Priority Data

Apr. 10, 1986 [JP] Japan ................................. 61-82482

[51] Int. Cl.$^4$ ............................................. G11C 13/00
[52] U.S. Cl. ..................................... 365/106; 365/127; 365/113; 369/13
[58] Field of Search ........................ 365/106, 109–111, 365/124–127, 157, 113; 369/13

[56] References Cited

U.S. PATENT DOCUMENTS

| | | | |
|---|---|---|---|
| 4,586,164 | 4/1986 | Eden | 365/127 X |
| 4,631,706 | 12/1986 | Bataden et al. | 365/127 |
| 4,637,008 | 1/1987 | Eden | 365/111 |

*Primary Examiner*—Stuart N. Hecker
*Assistant Examiner*—Alfonso Garcia
*Attorney, Agent, or Firm*—Parkhurst, Oliff & Berridge

[57] ABSTRACT

A memory medium for information storage and reproduction and an apparatus for reading information from the memory medium are set forth herein. The memory medium includes a solid storage layer formed of a pyroelectric and electro-optic material, and information is stored in the medium through local residual polarization of the layer owing to the pyroelectrical property of the material. The apparatus includes: (a) a light source for emitting a laser beam toward the medium; (b) a power source for applying electric power to the light source; (c) an optical system for converging the beam on the layer, so as to form a beam spot with a suitable size; (d) a sensing device for detecting an intensity of a laser beam reflected by, or a laser beam transmitted through, the layer, the intensity being changed owing to variation in refractive index of the layer due to the local residual polarization, the changes in the refractive index being based on the electro-optical property of the material, the sensing device generating a detection signal indicative of an intensity of the detected beam; and (e) a control device responsive to the sensing device, for generating a reproduction signal corresponding to the detection signal, the reproduction signal being used for the information reproduction.

5 Claims, 2 Drawing Sheets

SOLID MEMORY MEDIUM AND INFORMATION REPRODUCTION SYSTEM USING THE MEDIUM

BACKGROUND OF THE INVENTION

1. Field of the Art

The present invention relates in general to a solid memory medium, and more particularly to such a memory medium which comprises a solid storage portion formed of a pyroelectric and electro-optic material and an apparatus for reading information from the memory medium.

2. Related Art Statement

There are known a magnetic and a magneto-optical memory medium both of which are preferably used for writing thereon and reading therefrom a comparatively large amount of information. As to the magnetic memory medium, which is usually used in the form of a floppy disk or hard disk, information is written through magnetization of the magnetic layer, and the information stored is read out by a magnetic head. As to the magneto-optical memory medium or a magneto-optical disk, information is magnetically recorded on the disk, and the information recorded is optically retrieved.

3. Problems Solved by the Invention

However, all of the conventional memory media including the magnetic and magneto-optical memory media, have a problem of an insufficient density of information, that is, a comparatively small number of data bits per unit area of a memory medium. Those memory media provide another problem in that an apparatus needed for reading information from such a memory medium requires a large number of parts or elements.

In the above-indicated situation, the inventors have conducted various studies and investigations, and revealed that a pyroelectric and electro-optic material can be used as a memory medium. More specifically described, information is written on such a material through local residual polarization thereof owing to the pyroelectrical property of the material. The local residual polarization is caused by positive and negative electric charges which are locally generated by local heating of the material. The thus-stored information is retrieved by means of taking advantage of variation in refractive index of the material due to the local residual polarization. The variation in the refractive index is based on the electro-optical property of the material.

SUMMARY OF THE INVENTION

It is therefore an object of the present invention to provide a solid memory medium which enjoys an increased information density.

It is another object of the invention to provide an apparatus for reading information from such an improved memory medium, which is simplified in construction.

According to a first aspect of the present invention, there is provided a memory medium which comprises a solid storage portion formed of a pyroelectric and electro-optic material. Information is written on the storage portion through local residual polarization thereof owing to the pyroelectrical property of the material. The local residual polarization is caused by positive and negative electric charges which are locally generated by heat applied to the storage portion. The information stored is read out by utilizing variation in refractive index of the storage portion due to the local residual polarization. The variation in the refractive index due to the local residual polarization is based on the electro-optical property of the material.

In the memory medium arranged as described above, information storage can be effected optically, i.e., by optical means including a laser device which is adapted to emit a beam of laser toward the memory medium. Since the density of information written on the memory medium of the present invention depends mainly upon the size of a spot of the laser beam employed, the memory medium enjoys an increased information density, as compared with the conventional magnetic memory medium such as a magnetic floppy disk or hard disk, in which information is stored magnetically, i.e., by magnetic means including a magnetic head.

Further, the information stored in the memory medium of the present invention, is retrieved, by means of utilizing a difference between a refractive index of a local, spot part with the residual polarization, and a refractive index of the surrounding part with no residual polarization. More specifically described, information reproduction is effected by means of detecting variation in the intensity of laser beams which are reflected by (or transmitted through) the storage portion, that is, the polarized spot part or the surrounding part. It can therefore be said that an apparatus required for reading information from the memory medium of the present invention is simplified in construction, as compared with a known magneto-optical reproduction apparatus which needs a polarizer and an analyzer for reading information from a magneto-optical memory disk, more particularly for detecting changes in the Kerr rotation angles.

As the material for the solid storage portion of the memory medium of the present invention, monocrystalline lithium niobate ($LiNbO_3$) is preferably used.

In a preferred embodiment of the memory medium of the invention, the medium further comprises a protective layer formed on one of opposite surfaces of the solid storage portion and a heat-sink layer formed on the other surface of the storage portion. In this case, the protective layer is made of a transparent material, while the heat-sink layer is made of a material with a comparatively high heat conductivity.

According to another aspect of the present invention, there is provided an apparatus for reproducing information from a memory medium which includes a solid storage portion formed of a pyroelectric and electro-optic material, and in which information is stored through local residual polarization of the storage portion owing to the pyroelectrical property of the material: the apparatus comprising (a) a light source for emitting a laser beam toward the memory medium; (b) a power source for applying electric power to the light source, the power source being adjustable so that an intensity of the laser beam is suitable for the information reproduction; (c) an optical system for converging the laser beam on the storage portion of the memory medium, so as to form a laser-beam spot with a predetermined size on the storage portion; (d) sensing means for detecting an intensity of one of a laser beam reflected by, and a laser beam transmitted through, the storage portion of the memory medium, the intensity being varied owing to variation in refractive index of the storage portion due to the local residual polarization, the variation in the refractive index being based on the electro-optical property of the material, the sensing means generating a detection signal representative of the intensity of the one laser beam; and (e) control means responsive to the sensing means, for generating a reproduction signal corresponding to the detection signal, the reproduction signal being utilized for the information reproduction.

BRIEF DESCRIPTION OF THE DRAWINGS

The foregoing and optional objects, features and advantages of the present invention will be better understood from reading the following detailed description of preferred embodiments of the invention,. when considered in conjuction with the accompanying drawings, in which:

FIGS. 2, 3 and 4 are explanatory views illustrating pyroelectric effect associated with a solid storage layer of the memory disk of FIG. 1, respectively, in which;

FIG. 2 shows a thermal difference which is produced, between a local, spot part at temperature T1 and the surrounding part at temperature T2, by heat applied to the storage layer;

FIG. 3 shows positive and negative electric charges, or local residual polarization, resulting from the thermal difference produced on the layer of FIG. 2; and FIG. 4 shows a graph of a hysteresis loop representative of the pyroelectric effect, in which symbol "a" indicates the local residual polarization that is formed at the local spot part of the storage layer after the spot part has been heated and subsequently cooled.

DETAILED DESCRIPTION OF THE PREFERRED EMBODIMENTS

The present invention will be described in detail by reference to the accompanying drawings showing preferred embodiments of the invention.

Figure 1:
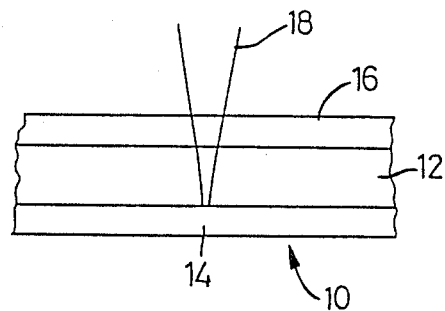
FIG. 1 is a cross-sectional view partially illustrating an arrangement of a preferred embodiment of a memory disk according to the present invention.

Referring first to FIG. 1, there is illustrated a memory medium in the form of a memory disk 10, which embodies the present invention. The memory disk 10 consists of three portions, that is, a solid storage portion in the form of a storage layer 12, a heat-sink layer 14 formed on one of opposite surfaces of the storage layer 12, and a protective layer 16 formed on the other surface of the storage layer 12. The storage layer 12 is made of monocrystalline lithium niobate (LiNbO₃), one of pyroelectric and electro-optic materials. The storage layer 12 therefore is a dielectric. The heat-sink layer 14 is formed on the storage layer 12 by vapor deposition of aluminum thereto. The protection layer 16 is formed on the layer 12 using a transparent material of silicon dioxide (SiO$_2$). The three layers 12, 14, and 16 have a thickness of about 0.5 mm, 0.5 mm, and 500 Å, respectively.

Information is written on the memory disk 10, more specifically on the storage layer 12, as follows:

Firstly, a beam of laser 18 emitted by a light source (not shown) is converged on the storage layer 12 through the protective layer 16, forming a laser-beam spot with the size of 1 μm φ at a local, spot part of the storage layer 12. The laser beam 18 incident to the spot part of the storage layer 12 is trapped or caged between the opposite interfaces of the layer 12, while reflected by the interfaces again and again. In consequence, the laser beam 18 is absorbed by the spot part, simultaneously heating the spot part to the extent that a thermal difference between the spot and surrounding part of the storage layer 12 becomes equal to about 200° C. In other words, the intensity of the laser beam 18 is previously adjusted so as to produce that thermal difference. In this connection, it is noted that a slope or inclination of the thermal difference is obtained mainly in a direction parallel to a plane of the storage layer 12. When heated, the storage layer 12, being a dielectric with the pyroelectrical property or effect, produces positive and negative electric charges at the spot part heated. Then, when cooled, residual polarization is formed due to the positive and negative electric charges, at the spot part. Thus, information is recorded on the storage layer 12 through the local residual polarization thereof.

Pyroelectrical effect, possessed by the storage layer 12 formed of lithium niobate crystal, is defined as producing positive and negative electric charges in a crystal when a thermal difference is caused in the crystal. Due to the positive and negative electric charges produced, a potential difference or voltage is generated in the crystal.

Figure 2:
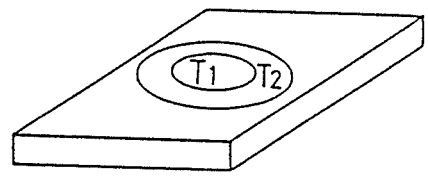
Figure 3:
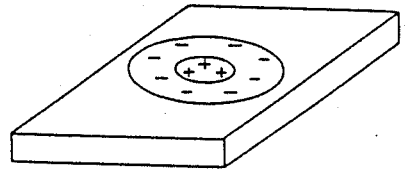

As illustrated in FIG. 2, when heated by the light beam 18, a thermal difference of 200° C. is produced between a central spot part at temperature T1 (higher) and the surrounding part at temperature T2 (lower), on one of opposite surfaces of the planar crystal (200° C.=T1−T2). Consequently, as illustrated in FIG. 3, positive and negative electric charges are caused on the surface of the LiNbO₃-crystal storage layer 12. The opposite surfaces of the crystal of the storage layer 12 correspond to the previously-described opposite interfaces thereof.

The voltage or potential difference V produced between the opposite surfaces of the storage layer 12 is determined by the following equation:

$$V = Q/C = Q/(\epsilon S/d)$$

wherein,

Q ; (pyroelectric constant) x (thermal difference)
ε; dielectric constant
S; area, and
d; thickness Since pyroelectric constant of monocrystalline lithium niobate (i.e., material of the storage layer 12) is 0.004 μq/cm$^2$, the value of Q is found to be $8 \times 10^{-3}$ Q/m$^2$, given that thermal difference is equal to 200° C. Since dielectric constant ε of the crystal of the layer 12 is $3.81 \times 10^{-11}$ F/m, and given that area S is equal to $1 \times 10^{-4}$ m$^2$ and distance d is equal to $5 \times 10^{-4}$ m, the potential difference V is found to be $1.05 \times 10^5$ kV, as follows:

$$V = \frac{8 \times 10^{-3}}{\frac{3.81 \times 10^{-11} \times 10^{-4}}{5 \times 10^{-4}}}$$

$$= 1.05 \times 10^5 \text{ kV}$$

Figure 4:
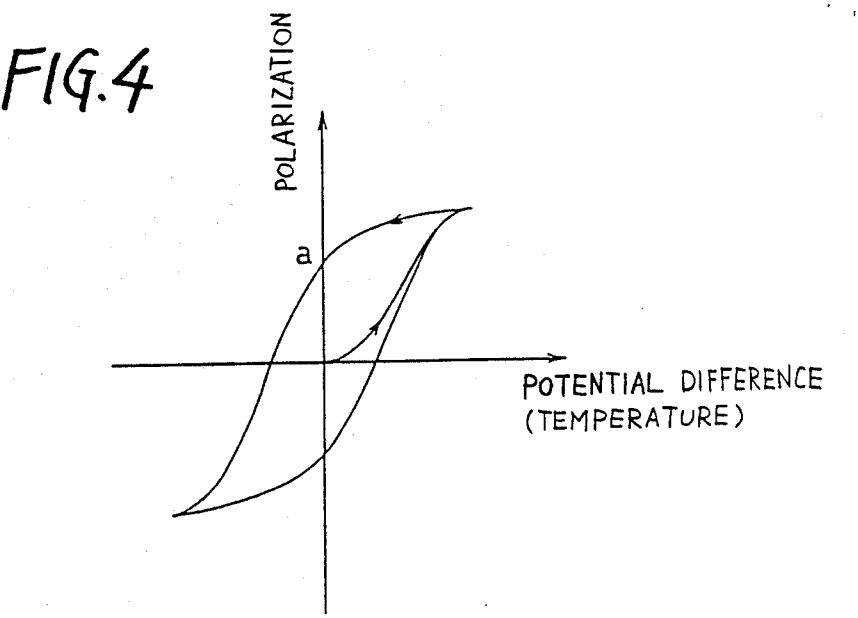

Since the planar crystal of the storage layer 12 (FIG. 2) is a dielectric, the spot part heated is polarized due to the electric charges generated. As shown in FIG. 4, when cooled, the local spot part obtains residual polarization indicated at "a" on a hysteresis loop representative of the pyroelectrical effect. The position of "a" on the Y axis of the graph shows a magnitude of the local residual polarization. Thus, information is written on the crystal, that is, storage layer 12, through the local residual polarization with the magnitude of "a".

As stated above, the storage layer 12 is locally heated for utilizing the pyroelectric effect thereof, so as to write information thereon. In this connection, it is noted that the storage layer 12 is provided on one surface thereof with the aluminum layer 14 having a high thermal conductivity, that is, a good heat-sink property. The heat-sink layer 14 contributes to preventing the storage layer 12 from storing heat, that is, from being excessively heated. This arrangement assures an increased speed at which to write information on the storage layer 12. Furthermore, the heat-sink layer 14 contributes to increasing the density of information stored on the storage layer 12, since the heat-sink layer 14 sufficiently absorbs the generated heat before the heat spreads from the central spot part to the surrounding part. Owing to the aluminum layer 14, the thermal difference produced is immediately eliminated, however forming a suitable residual polarization.

The refractive index of the storage layer 12 is varied at the local, spot parts with the residual polarization, according to the electro-optical property of the material of the layer 12.

The refractive index $n_z$ is obtained by the following equation:

$$n_z = n_e - \tfrac{1}{2}(n_e^3 r_{33} E_z)$$

wherein, $n_e$; extraordinary index $r_{33}$; electro-optical constant, and $E_z$; electric field in a direction of z axis of the crystal (i.e., direction parallel to the plane of the crystal)

According to the concept of the present invention, information stored in the memory disk 10 is retrieved by means of utilizing the variation in the refractive index of the storage layer 12 due to the local residual polarization.

Figure 5:
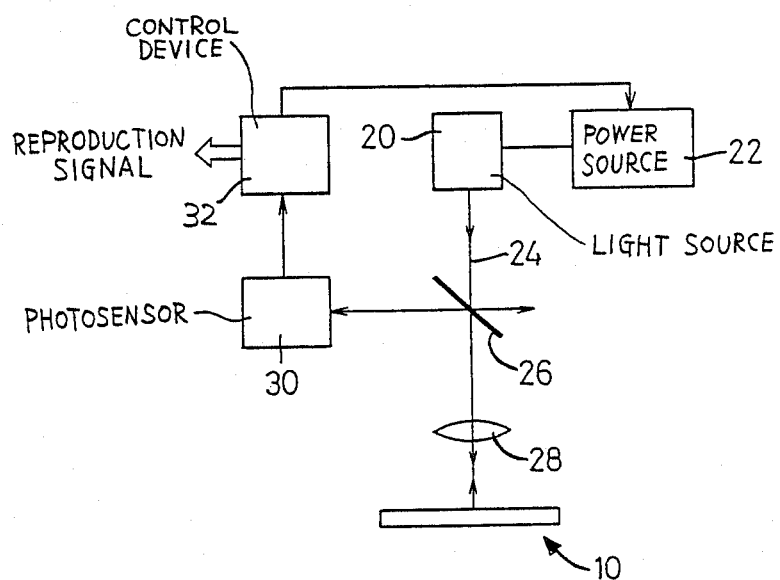
FIG. 5 is a schematic view illustrating a construction of a preferred embodiment of an apparatus for reading information from the memory disk of FIG. 1.

Referring next to FIG. 5, there is schematically illustrated an optical apparatus for reading information from the memory disk 10.

In the figure, reference numeral 24 designates a beam of laser 24 emitted by a light source 20. The optical apparatus is equipped with a power source 22 for applying electric power to the light source 20. The light source 20 is adjustable so as to emit a laser beam 24 suitable for the information reading or reproduction, by means of controlling the amount of electric power supplied from the power source 22 to the light source 20. In other words, an intensity of the laser beam 24 is maintained so as not to substantially heat the storage layer 12 at the spot part to which the laser beam 24 is incident. The power source 22 is connected to a control device 32 which supplies to the source 22 a signal to command application of electric power to the light source 20. By using the laser beam 24, the information stored in the memory disk 10 is reproduced, as described below:

The laser beam 24 emitted by the light source 20 is converged on the memory disk 10 by an optical system including a half mirror 26 and a focusing lens 28, thereby forming a laser-beam spot with a size of about 1 μm φ on the surface of the disk 10. The light beam 24 is successively emitted by the light source 20 toward the memory disk 10. The light beam 24, incident to the memory disk 10, is transmitted through the protective layer 16 and the storage layer 12, and reflected by the heat-sink layer 14, more specifically the interface between the layers 12 and 14. The reflected laser beam 24 goes back along the same path as its incident path, to the half mirror 26 by which the direction of the beam 24 is changed to a direction toward sensing means in the form of a photosensor 30.

Information is stored in the memory disk 10, through local residual polarization of the storage layer 12 of the disk 10. Since the storage layer 12 is made of a material with the electro-optical property or effect, the refractive index of the storage layer 12 is varied due to electric field caused by the local residual polarization. The intensity of the laser beam 24 is changed when transmitted through the local spot part with the residual polarization, since the beam 24 is scattered and/or refracted at the spot part with the varied refractive index. The photosensor 30 is adapted to detect the laser beam 24, and generates a detection signal indicative of an intensity of the detected laser beam 24, to the control device 32. The variation in the intesity of the laser beams 24 which are detected by the photosensor 30, corresponds to pulse train of information stored on a track of the storage layer 12, since the memory disk 10 is rotated about its rotation axis at a predetermined speed. The control device 32 is responsive to the photosensor 30, for generating a reproduction signal in the form of a serial or parallel signal, which corresponds to the detection signal supplied from the photosensor 30. Thus, information stored in the memory disk 10 is retrieved.

The control device 32 is operable to command the power source 22 to supply greater power to the light source 20, for the purpose of erasing the information stored in the memory disk 10. The intensity of the laser beam 24 is raised owing to the increased electric power supplied to the light source 20, and the storage layer 12 is heated by the strengthened laser beam 24 up to temperatures at about 150° C. where the storage layer 12 is annealed. In this connection, it is noted that a focusing mechanism (not shown) may be provided, if necessary, which is adapted to move the focusing lens 28 along the optical axis of the instant optical apparatus, so as to make the size of the laser-beam spot formed on the storage layer 12 greater. After the storage layer 12 is heated by the widened laser-beam spot and to the temperatures insufficient to realize the pyroelectric effect, and then cooled by annealing, the residual polarization of each of the local spot parts of the storage layer 12 is effectively erased.

While the present invention has been illustrated for illustrative purpose only, the invention may be otherwise embodied with various changes and modifications.

For example, the memory disk 10 embodying a memory medium of the present invention may not be provided with the heat-sink layer 14. In other words, the heat-sink layer 14 may be omitted from the disk 10. In this case, information may be read out by means of detecting variation in intensity of laser beams transmitted through the disk 10, in place of laser beams reflected by the heat-sink layer 14 in the case of the illustrated embodiment.

Further, the light source 20 of FIG. 5 for the information reproduction and erasure may be adapted to also serve for information storage.

Referring to FIG. 5, there is depicted the light source 20 which is disposed so as to emit the laser beam 24 at a right angle to the memory disk 10. However, for the information reproduction, the light source 20 may be disposed so that the laser beam 24 is obliquely incident to the memory disk 10.

The optical apparatus of FIG. 5 may further be provided with other optical members, such as one or more lenses, mirrors, beam splitters, and optical fibers, along its optical axis.

It is to be understood that the present invention may be further embodied with other changes and improvements that may occur to those skilled in the art, without departing from the spirit of the invention as featured in the pending claims.

What is claimed is:

1. A memory medium comprising:
   an information storage layer formed of monocrystalline lithium niobate;
   said storage layer being adapted to store information through local residual polarization thereof owing to the pyroelectrical property of said lithium niobate, said local residual polarization being caused by positive and negative electric charges that are locally generated by heat applied to the storage layer, said local residual polarization causing variation in refractive index of said storage layer owing to the electro-optical property of said lithium niobate, said storage layer permitting the information to be read out by utilizing said variation in refractive index thereof, and a conductive layer.

2. A memory medium comprising:
   an information storage layer having opposite surfaces and being formed of monocrystalline lithium niobate, said storage layer being adapted to store information through local residual polarization thereof owing to the pyroelectrical property of said lithium niobate, said local residual polarization being caused by positive and negative electric charges that are locally generated by heat applied to the storage layer, said local residual polarization causing variation in refractive index of said storage layer owing to the electro-optical property of said lithium niobate, said storage layer permitting the information to be read out by utilizing said variation in refractive index thereof;
   a protective layer formed on one of said opposite surfaces of said information storage layer; and
   a heat-sink layer formed on the other surface of the storage layer, said heat sink layer being made of a material having a heat conductivity so as to facilitate the dispersion of heat.

3. An information reproductive system, comprising:
   a memory medium including an information storage layer formed of monocrystalline lithium niobate, and a conductive layer, said storage layer being adapted to store information through local residual polarization thereof owing to the pyroelectrical property of said lithium niobate, said local residual polarization causing variation in refractive index of said storage layer owing to the electro-optical property of said lithium niobate;
   a laser light source for emitting a laser beam toward said memory medium;
   a power source for supplying electric power to said laser light source;
   first means for converging said laser beam on said storage layer of the memory medium so as to form a laser-beam spot of a predetermined size thereon;
   second means for detecting an intensity of one of the laser beam reflected by, and the laser beam transmitted through, said storage layer of the memory medium, said intensity of the laser beam being varied depending upon said variation in refractive index of said storage layer;
   third means for generating a detection signal representative of said intensity of the laser beam; and
   a fourth means responsive to said third means, to generate a reproduction signal corresponding to said detection signal, said information stored on said storage layer being reproduced by utilizing said reproduction signal.

4. A method of storing information on and reproducing information from a memory medium, comprising:
   preparing as said memory medium a storage layer formed of monocrystalline lithium niobate;
   locally heating said storage layer to a predetermined temperature so as to generate positive and negative electric charges;
   cooling said storage layer via a conductive layer so as to produce local residual polarization therein due to said positive and negative electric charges, whereby information is stored on said storage layer, said local residual polarization causing variation in refractive index of said storage layer owing to the electro-optical property of said lithium niobate; and
   utilizing said variation in refractive index of said storage layer for reproducing said information stored on the storage layer.

5. A method according to claim 4, wherein the step of utilizing said variation in refractive index of said storage layer comprises emitting a laser beam to said storage layer and detecting an intensity of one of the laser beam reflected by the storage layer, and the laser beam transmitted through the storage layer.

* * * * *